(12) United States Patent
Schron, Sr. et al.

(10) Patent No.: US 8,727,329 B2
(45) Date of Patent: May 20, 2014

(54) MOUNTING SYSTEM

(71) Applicant: Jergens, Inc., Cleveland, OH (US)

(72) Inventors: Jack Schron, Sr., Cleveland, OH (US); Terry Schron, Garden Grove, CA (US); Harry P. Fuller, Newbury, OH (US)

(73) Assignee: Jergens, Inc., Cleveland, OH (US)

( * ) Notice: Subject to any disclaimer, the term of this patent is extended or adjusted under 35 U.S.C. 154(b) by 0 days.

(21) Appl. No.: 13/968,890

(22) Filed: Aug. 16, 2013

(65) Prior Publication Data

US 2014/0023426 A1    Jan. 23, 2014

Related U.S. Application Data

(63) Continuation of application No. 13/267,473, filed on Oct. 6, 2011, now Pat. No. 8,534,658, which is a continuation-in-part of application No. 13/238,936, filed on Sep. 21, 2011, now abandoned, which is a continuation-in-part of application No. 12/754,026, filed on Apr. 5, 2010.

(60) Provisional application No. 61/166,288, filed on Apr. 3, 2009.

(51) Int. Cl.
*B25B 1/20*  (2006.01)
*B23Q 3/00*  (2006.01)
*F16B 5/00*  (2006.01)

(52) U.S. Cl.
USPC ............. 269/289 R; 269/37; 269/309; 29/464

(58) Field of Classification Search
USPC ................... 269/289 R, 37, 309; 29/464, 559
See application file for complete search history.

(56) References Cited

U.S. PATENT DOCUMENTS

| | | | |
|---|---|---|---|
| 724,116 A | | 3/1903 | Maley |
| 1,033,758 A | * | 7/1912 | Howell ........................ 269/93 |
| 2,417,799 A | | 3/1947 | Seaver |
| 2,707,419 A | | 5/1955 | Schron |
| 3,263,549 A | | 8/1966 | Jordan et al. |
| 3,518,743 A | | 7/1970 | Muller |
| 3,566,662 A | | 3/1971 | Champoux |
| 3,568,371 A | | 3/1971 | Day et al. |

(Continued)

OTHER PUBLICATIONS

International Preliminary Report on Patentability dated Oct. 4, 2011 in corresponding International Patent Application No. PCT/US2010/02991, filed Apr. 5, 2010.

(Continued)

*Primary Examiner* — Lee D Wilson
*Assistant Examiner* — Alvin Grant
(74) *Attorney, Agent, or Firm* — Rankin, Hill & Clark LLP (57) ABSTRACT

A mounting and alignment system for selectively securing and accurately aligning a first plate relative to a second plate, the mounting system including a shank and a receiver arrangement with an annular locking ring and an annular receiver bushing. The bushing having an inner passage and an oppositely facing outer bushing surface. The outer bushing surface having at least one receiver bearing surface shaped to engage a bearing surface of an associated mounting opening in one of the plates to align the receiver bushing laterally within the opening. The inner passage of the bushing being shaped to receive and align with a shaft portion of the shank. The locking ring configured to secure the bushing axially within the mounting opening.

16 Claims, 10 Drawing Sheets

(56) References Cited

U.S. PATENT DOCUMENTS

| | | | |
|---|---|---|---|
| 3,866,644 A * | 2/1975 | Stubbs | 269/307 |
| 4,132,147 A | 1/1979 | Contaldo | |
| 4,191,366 A * | 3/1980 | Rabin | 269/47 |
| 4,261,666 A | 4/1981 | Katayama | |
| 4,500,079 A * | 2/1985 | Morghen | 269/47 |
| 4,530,493 A * | 7/1985 | Break | 269/93 |
| 4,538,355 A | 9/1985 | Morghen | |
| 4,567,821 A | 2/1986 | McDonald | |
| 4,585,217 A * | 4/1986 | Erickson | 269/56 |
| 4,645,391 A | 2/1987 | Fallert | |
| 4,711,437 A | 12/1987 | Longenecker et al. | |
| 4,711,760 A | 12/1987 | Blaushild | |
| 4,767,108 A | 8/1988 | Tanaka et al. | |
| 4,794,687 A * | 1/1989 | Peters et al. | 29/559 |
| 4,819,475 A | 4/1989 | Irvello | |
| 4,863,205 A | 9/1989 | Schron et al. | |
| 4,863,326 A | 9/1989 | Vickers | |
| 4,932,295 A | 6/1990 | Erickson | |
| 5,064,321 A * | 11/1991 | Barnes | 409/219 |
| 5,085,414 A | 2/1992 | Weaver | |
| 5,186,567 A | 2/1993 | Evenson et al. | |
| 5,190,273 A | 3/1993 | Salvagnini | |
| 5,234,205 A * | 8/1993 | Shanley | 269/99 |
| 5,342,030 A | 8/1994 | Taylor | |
| 5,535,995 A | 7/1996 | Swann et al. | |
| 5,788,225 A | 8/1998 | Iwata et al. | |
| 5,941,700 A | 8/1999 | Fuchs | |
| 6,042,096 A | 3/2000 | MacLean | |
| 6,205,637 B1 | 3/2001 | Williams | |
| 6,279,888 B1 | 8/2001 | Wal, III | |
| 6,391,144 B1 | 5/2002 | Gilbert, Jr. | |
| 6,406,229 B1 | 6/2002 | Derrick et al. | |
| 6,412,768 B1 | 7/2002 | Peckham et al. | |
| 6,442,906 B1 | 9/2002 | Hwang | |
| 6,513,802 B2 | 2/2003 | Seger | |
| 6,572,356 B2 | 6/2003 | Seger | |
| 6,726,687 B2 | 4/2004 | Jackson | |
| 7,165,961 B2 | 1/2007 | Jachimski | |
| 7,922,158 B2 | 4/2011 | Fredrickson et al. | |
| 8,079,579 B2 | 12/2011 | Fredrickson et al. | |
| 8,109,493 B2 | 2/2012 | Koskovich et al. | |
| 8,194,385 B1 | 6/2012 | Miller et al. | |
| 2007/0280621 A1 | 12/2007 | Livingston et al. | |

OTHER PUBLICATIONS

Jergens, Inc.; "Receiver Busings, Back Mount"; www.jergensinc.com; Mar. 26, 2010.

Jergens, Inc.; "Ball Lock Mounting System"; Jergens Master Catalog; Published by Jergens, Inc., U.S.A., 2007; pp. 1.4 through 1.21.

Jergens, Inc.; "Ball Lock Mounting System"; Jergens Master Catalog; Published by Jergens, Inc., U.S.A., 2007; pp. 1.2 through 1.5 and 1.16.

\* cited by examiner

MOUNTING SYSTEM

This application is a continuation application of prior pending U.S. patent application Ser. No. 13/267,473 filed on Oct. 6, 2011 (still pending), which is a continuation-in-part application of U.S. patent application Ser. No. 13/238,936 filed on Sep. 21, 2011, which is a continuation-in-part application of prior pending U.S. patent application Ser. No. 12/754,026 filed on Apr. 5, 2010 and which claims priority in U.S. Provisional Patent Application Ser. No. 61/166,288 that was filed on Apr. 3, 2009; all of which are incorporated by reference herein.

This invention of this application relates generally to the art of mounting systems and, more particularly, to a mounting system used as a quick-change mounting and location system for tooling and the like.

Mounting systems are known in the art and have been used over the years to accurately mount one structure to a substrate structure. With respect to the invention of this application, it has been found that the mounting system works particularly well in the accurate mounting of a fixture plate onto a subplate wherein the subplate can be fixed relative to a machining table wherein this application will be described with reference to these structures but has broader application wherein this description should not be limiting in nature.

INCORPORATION BY REFERENCE

Quick-change locking systems have been used over the years and are shown in the attached pages, which we relate to Assignee's BALL LOCK mounting system, which are incorporated by reference herein, for showing the same. Also incorporated by reference is U.S. Pat. No. 2,707,419, to Schron which discloses a system for locating a fixture plate and is incorporated by reference herein for showing the same.

BACKGROUND OF THE INVENTION

Again, the invention of this application relates to mounting system and will be described in connection with fixture plates and subplates; however, the invention of this application has a much broader application and can be used in connection with a wide range of quick-change systems and even long-term mounting systems, which are known in the art. Mounting systems have been used over the years for a wide range of applications and can be used to quickly and accurately locate and lock a fixture plate to a subplate. In general terms, the mounting systems are comprised of three general components. These include a locating shank, a liner bushing, and a receiver bushing.

The receiver bushing is mounted to the subplate or machine table, and the liner bushing is mounted to the fixture plate. The locating shank is then positioned through the liner and into the receiver to provide both an accurate location and a locking of the fixture plate to the subplate. This locking action typically takes the form of either a threaded engagement or Assignee's BALL LOCK locking system.

As is known in the art, more than one set of the mounting systems can be used to accurately locate the fixture plate to the subplate. In this respect, if a single mounting system is used without any other locating device, the fixture plate would rotate about the shank axis. This would cause the fixture plate to become misaligned with the subplate. Therefore, more than one mounting system is typically used in these mounting arrangements. However, it has been found that the mounting arrangements can include both positioning mounting systems and holding mounting systems. More particularly, in that, the positioning of a fixture plate to a subplate is essentially a two-dimensional orientation; two mounting systems can be used to control the positioning of the fixture plate relative to the subplate. Then, additional mounting systems can be used to help hold the fixture plate relative to the subplate even though these other mounting systems do not control the positioning of the fixture plate relative to the subplate. For these systems that are used for holding only, the liner does not need to be positioned within the fixture plate. Conversely, the opening in the fixture plate just needs to be larger than the shaft portion of the shank to allow the free passage of the shank through the fixture plate. This provides only a hold-down force for this particular mounting arrangement and does not provide for the alignment of the fixture plate relative to the subplate.

While these mounting systems have been affective in the field, they can be costly to produce and install. In this respect, the prior art mounting systems include a receiver bushing that it is bolted to the subplates by multiple fasteners spaced about the receiver axis. As is referenced above, the mounting systems can be used for both securing the fixture plate to the subplate and for alignment of the fixture plate relative to the subplate. When the mounting system is used for alignment, it is important to accurately locate the individual components of the system so that they line up with one another. Thus, the axis of the liner and the axis of the receiver must be aligned to one another as close as possible. Further, this alignment must fall within a certain tolerance for the resulting fixture plate alignment to be within a desired tolerance. As a result, each machining operation used to create the mounting opening for the receiver bushing must be aligned to specified tolerances. By utilizing multiple fasteners to hold the receiver bushing within the subplate, multiple machining operations are necessary to cut the threads needed to receive these multiple fasteners within the subplate. Further, these cut threads must be aligned with the opening in the receiver bushing. While the position of the cut threads may not be critical in all uses of the mounting system (such as mounting systems used only to hold down the fixture plate), the drilling of the holes and cutting of the threads are still time consuming and adds considerable labor cost to the installation of the mounting system. Further, the use of fasteners spaced about the receiver axis only provides spaced hold-down force about this axis and can weaken the receiver wall in that holes must be drilled therethrough to allow the passage of these fasteners. Further, there is a competing interest between increasing the number of fasteners to increase the hold-down point and the weakening of the receiver wall. It has been found that three fasteners provide the best balance between contact points, installation cost, and weakening the receiver wall.

SUMMARY OF THE INVENTION

In accordance with the present invention, provided is a mounting system that provides the useful benefits of the prior art mounting systems but which overcomes many of the shortcomings of the prior art systems. More particularly, provided is a mounting system for securing a fixture plate to a subplate, which eliminates the use of traditional fasteners and replaces them with an annular gland ring to secure the receiver bushing to the subplate.

More particularly, the mounting system according to the present invention can include a receiver bushing arrangement for the mounting system for securing a plate to the subplate, which utilizes an annular receiver bushing having an inner passage extending about a passage axis. The bushing further includes a radially outwardly facing peripheral bushing surface and the inner passage is shaped to receive the shaft portion of a locking shank. This inner passage can also have a mating locking arrangement allowing the locking arrangement of the shank to selectively interengage with the receiver bushing and secure the shank relative to the receiver thereby securing the fixture plate to the subplate.

Further, the outer bushing surface can have at least one receiver-bearing surface shaped to engage the bearing surface of the mounting opening to align the receiver laterally within the mounting opening. The bushing can further include a downwardly facing support edge to either help maintain the receiver bushing within the mounting opening and/or position the receiver axially within the mounting opening.

According to certain aspects of the present invention, the system includes an annular gland ring having an outer diameter thread configured to threadingly engage an inside diameter thread in the peripheral surface of the associated mounting opening. The threaded gland ring having a contact edge configured to engage the receiver bushing when the gland ring is tightened in the mounting opening generally about the passage axis. The gland ring can be used to force the support edge of the receiver against the bottom ledge of the mounting opening as the gland ring is tightened into the mounting opening, thereby securing the receiver axially in the mounting opening and/or aligning the receiver bushing axially within the opening.

According to another aspect of the present invention, the mounting system can include a receiver bushing with a first and a second peripheral bushing surface wherein the gland ring can extend about one of these peripheral bushing surfaces thereby allowing the receiver bushing to extend upwardly towards the upper subplate surface of the subplate within a central opening in the gland ring.

According to yet further aspects of the present invention, the gland ring can be a unified structure with the receiver bushing wherein a single structure can be threadingly engaged with the subplate.

According to even yet further aspects of the present invention, the annular gland ring includes a snap or retainer ring configured to lock into an annular groove or ledge in the peripheral surface of the associated mounting opening. The retainer ring can lock the receiver bushing within the mounting opening in combination with a lower edge within the mounting open.

According to further embodiments of this application, the receiver bushing can be a double sided bushing wherein the shank can be inserted into the receiver bushing from either end. Furthermore, the bushing can have an extended threaded outer surface that can use a keyway locking arrangements to lock the bushing rotationally within the plate opening or hole.

These and other objects, features and advantages of the invention will become apparent to those skilled in the art upon a reading of the detailed description of the invention set forth below, taken together with the drawings which will be described in the next section.

BRIEF DESCRIPTION OF THE DRAWINGS

The invention may take physical form in certain parts and arrangements of parts, and a preferred set of embodiments of which will be described in detail and illustrated in the accompanying drawings, which form a part of the specification and wherein.

DETAILED DESCRIPTION OF THE INVENTION

Figure 1:
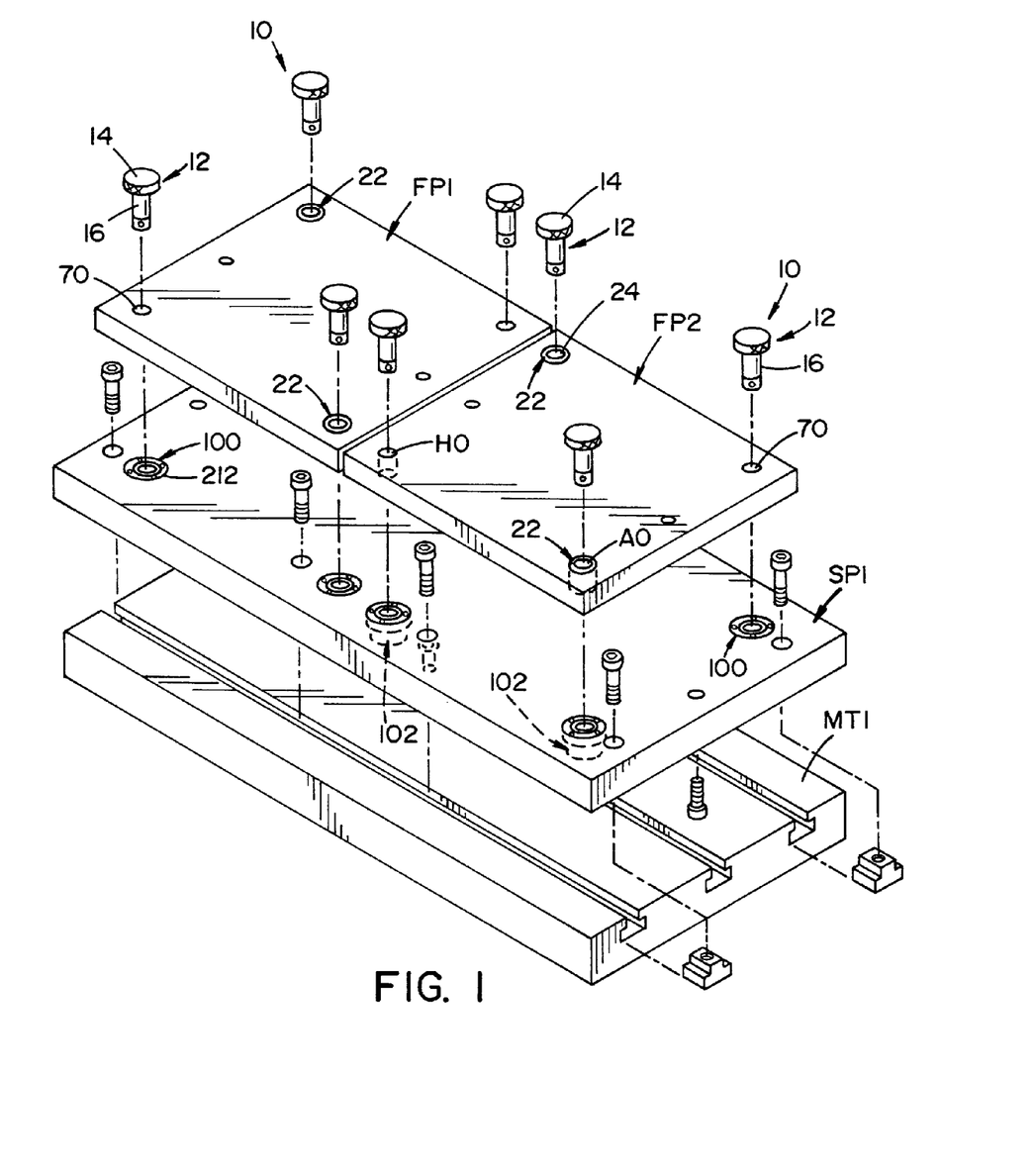
FIG. 1 is a top perspective view in exploded format showing mounting systems according to the present invention positioned relative to a fixture plate, a subplate and a machining table.

Referring now to the drawings wherein the showings are for the purpose of illustrating preferred and alternative embodiments of the invention only and not for the purpose of limiting the same, shown in FIG. 1 is a hold-down arrangement wherein multiple mounting systems are used to secure fixture plates FP1 and FP2 to a single subplate, SP1, which in turn is mounted to a machining table, MT1.

In greater detail, while a machining table is shown in these figures, the invention of this application can be used in connection with any support structure, which is known in the art. Further, as is referenced above, the invention of this application is being described in relation to fixture plates and subplates; however, the invention this application can be used with other mounting structures wherein the plate structure used in this application is merely an example of the use of the invention of this application.

As is discussed above, the hold-down arrangement, which includes multiple mounting systems according to the invention of this application, can include both alignment openings AO and/or hold-down openings HO in the fixture plate, which is to be secured to the subplate. In this respect, it has been found that in order to properly align the fixture plate relative to the subplate, two alignment openings should be produced in the fixture plate. These two alignment openings include a liner 22, which will be discussed in greater detail below, and the hold-down openings HO do not need to include liner 22.

Figure 2:
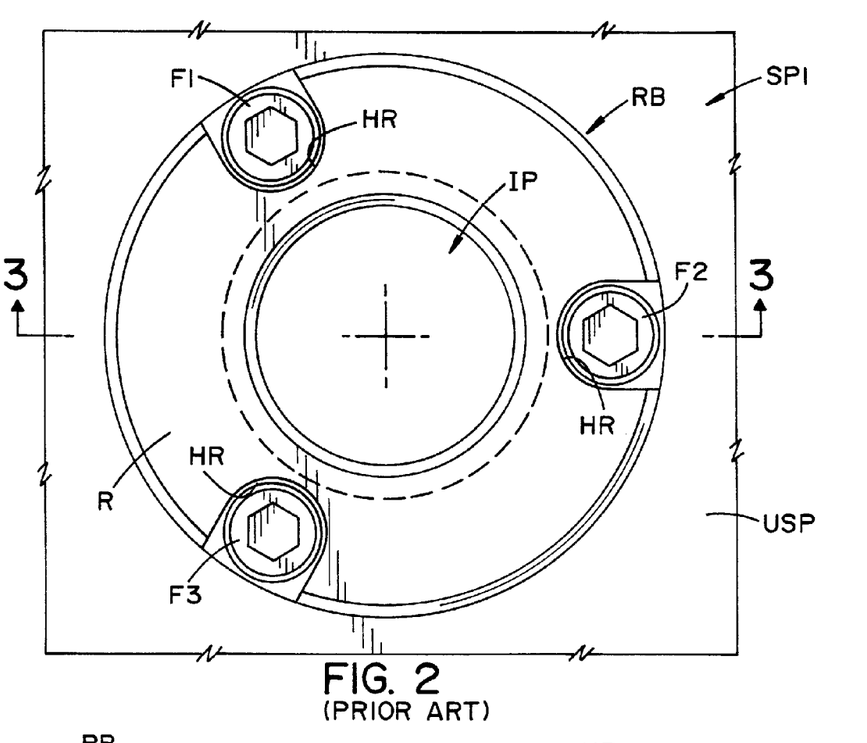
FIG. 2 is a top view of a prior art receiver arrangement.
Figure 3:
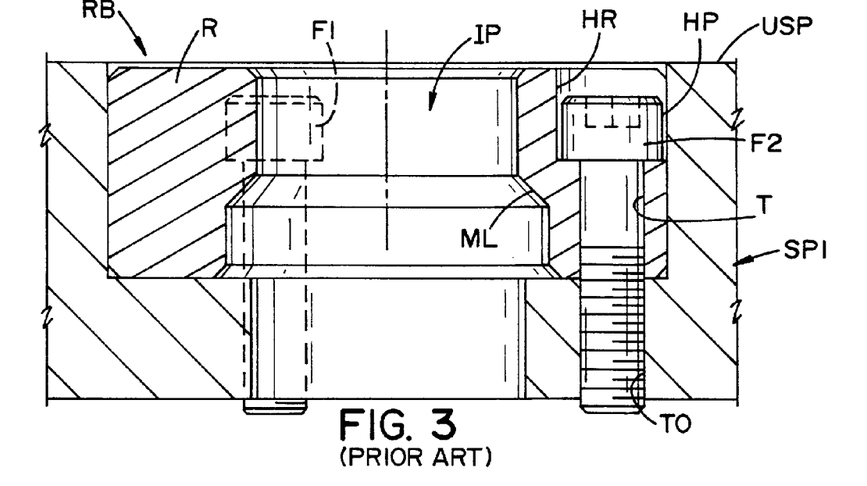
FIG. 3 is a sectional view taken along lines 3-3 in FIG. 2.

With reference to FIGS. 2 and 3, shown is a prior art receiver bushing arrangement RB. This bushing arrangement is secured to subplate SP1 by way of fasteners F1-F3. In this arrangement, a receiver R includes a plurality of through holes T drilled therethrough with head recesses HR shaped to receive a head portion HP of the fasteners to allow the fasteners to be counter-sunk below an upper surface USP of subplate SP1. As a result, receiver R must include multiple drilling operations and/or milling operations to both drill the through hole and create the head recess. As can be appreciated, these drilling operations and/or milling operations must be performed with a relatively high degree of accuracy in order to secure the receiver bushing to the subplate. In addition, subplate SP1 also needs corresponding threaded openings TO shaped to receive fasteners F1-F3 and these threaded openings must be in alignment with the through holes in the receiver. In addition to the added expense of the through holes and threaded holes, the drilling of through holes T in receiver R structurally impacts the annular configuration of the receiver bushing thereby potentially producing stress points and/or difficulties in the heat-treated process for this component. As will be discussed in greater detail below, the receiver includes an inner passage IP that can include any one of a number of mating-locking arrangements ML, which are known in the art.

With reference to FIGS. 4-7, shown is a mounting system 10 including a shank 12, with a head portion 14 and a shaft portion 16. Mounting system 10 can further include liner 22 having an inner liner passage 24 and include a receiver arrangement 30. As is referenced above, liner 22 can be positioned in fixture plate FP and receiver arrangement is positioned within subplate SP such that shank 12 can be used to secure the fixture plate to the subplate, which will be discussed in greater detail below.

Shank 12 can be any shank known in the art or even shanks that will be known in the art in the future. Head portion 14 of shank 12 can include a tooling opening 34 that can be any one of a number of tooling openings. In this particular embodiment, tooling opening 34 is a passage within shank 12, which allows a tool to be inserted within the passage to actuate a locking arrangement 36, which can be located near a distal end 38 of shaft portion 16. This particular locking arrangement includes protuberances 40 and 41 which can be spherical and which are selectively movable between an unlocked condition and a locked condition. Shown in FIG. 4, protuberances 40 and 41 are in a locked condition wherein they are extended outwardly from shaft portion 16. These protuberances can be activated with a threaded member 44 which can move them between the locked condition wherein the protuberances extended outwardly of the shaft portion and an unlocked condition wherein protuberances 40 and 41 move inwardly into the shaft portion.

Figure 4:
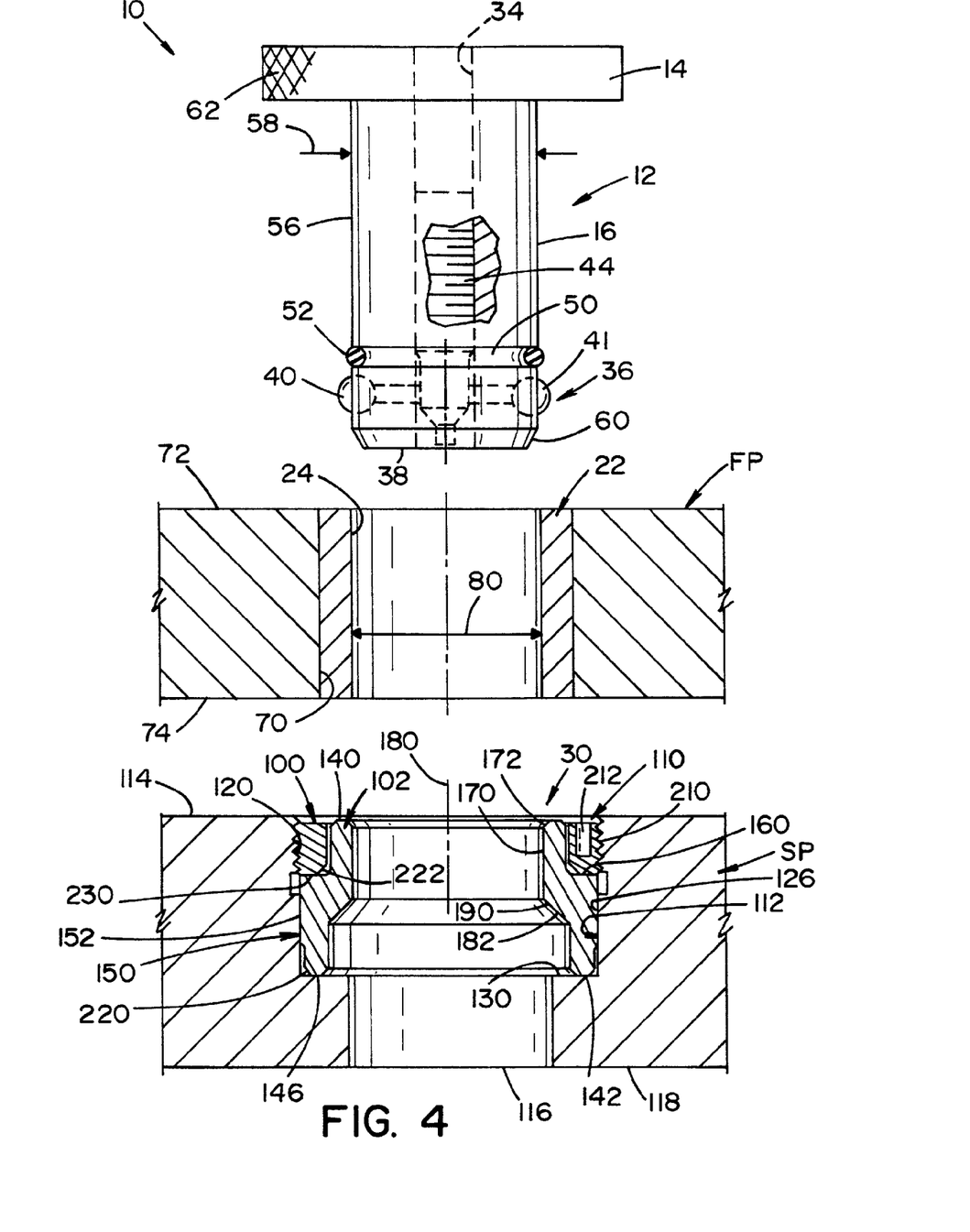
FIG. 4 is an exploded, partially sectioned, view of a mounting system according to certain aspects of the present invention.

Shaft portion 16 can further include a grommet grove 50 shaped to receive a grommet 52 that can be used to produce a resistance fit between shank 12 and receiver arrangement 30. This can be used to hold the shank relative to the receiver while the shank is activated between the unlocked and the lock conditions. Shaft portion 16 can be cylindrical having a radially outwardly shaft surface 56 with a diameter 58. Shaft 16 can further include a chamfer 60, which allows the shaft portion to be more easily inserted into liner 22 and/or receiver arrangement 30. In this embodiment, head portion 14 is a circular head portion having a knurling 62 on its outer surface. As will be discussed in greater detail below, shank 12 can be any shank known in the art without detracting from the invention of this application, which includes other locking arrangements and other head configurations. Further, shank 12 can have a wide range of coatings applied to the head portion and/or the shaft portion including, but not limited to, a black oxide coating. The material used to produce shank 12 can also be any material known in the art, including carbon steel that is heat-treated to a Rockwell-hardness on the C scale of between 35 and 60 Rc.

Liner 22 can also be any liner known in the art and can be joined to fixture plate FP by any method known in the art. This includes, but is not limited to, press fitting the liner into a through hole 70 machined into fixture plate FP. In this respect, fixture plate FP can have an upper surface 72 and an oppositely facing lower plate surface 74 wherein through hole 70 extends from upper plate surface 72 to lower plate surface 74. Through hole 70 can be sized to allow the press-fitted connection between the liner and the through hole to secure these parts relative to one another. However, it should be noted that any other means to join the liner to the fixture plate can be used without detracting from the invention of this application. Furthermore, as referenced above, through hole 70 does not need to include liner 22 wherein a complete hold-down arrangement would include some mounting systems 10 with liners and others without. In fact, it is recommended that only two liners be used for each plate joined to a subplate. Further, liner 22 can be made from a wide range of materials including, but not limited to, carbon steel. This material can be heat-treated as is known in the art including a heat treat wherein the liner has a Rockwell-hardness on the C scale of between 60 and 70 RC.

Inner passage 24 of liner 22 has a diameter 80 that can be configured to be only slightly larger than diameter 58 of shaft portion 16 thereby producing a close fit between shaft 16 and liner 22, which allows the mounting system to locate fixture plate FP relative to subplate SP in a known position. In that these two diameters are closely matched to one another, chamfer 60 on distal end 38 can be used to help guide shaft portion 16 into the inner liner passage.

Receiver arrangement 30 in one set of embodiments is a two-piece arrangement including an annular gland ring or nut 100 and an annular receiver bushing 102. More particularly, subplate SP includes one or more mounting opening 110, which can be circular openings, having an opening peripheral surface 112 that can extend downwardly from upper subplate surface 114 towards a bottom extent 116. Mounting opening 110 can be a through hole or a pocket wherein in the embodiment shown, bottom extent 116 is at lower subplate surface 118; however, in other embodiments, the bottom extent is spaced from the lower subplate surface without detracting from the invention of this application. Opening peripheral surface can include multiple sections with or without the same diameter or size. In the embodiment shown, opening peripheral surface 112 includes a threaded portion 120 having an inside diameter thread 122 and an opening bearing surface 126. In this set of embodiments, threaded portion 120 is adjacent to upper subplate surface 114 and bearing surface 126 is spaced from both upper surface 114 and lower subplate surface 118. Mounting opening 110 can further include a bottom ledge 130 that is spaced from bottom extent 116 and which can be used to align receiver bushing 102 axially, which will be discussed in greater detail below.

Figure 6:
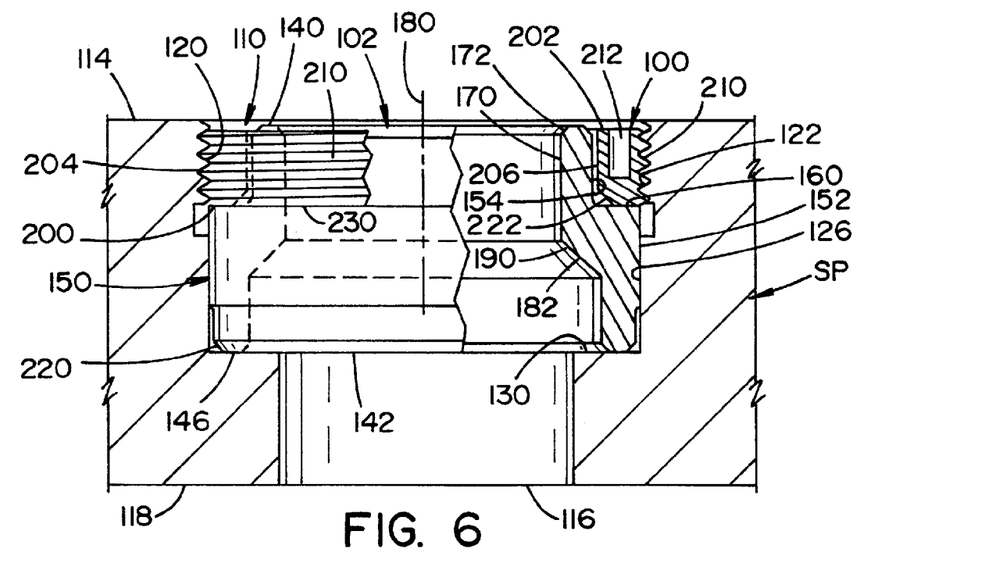
FIG. 6 is a sectional view taken along line 6-6 in FIG. 5.
Figure 7:
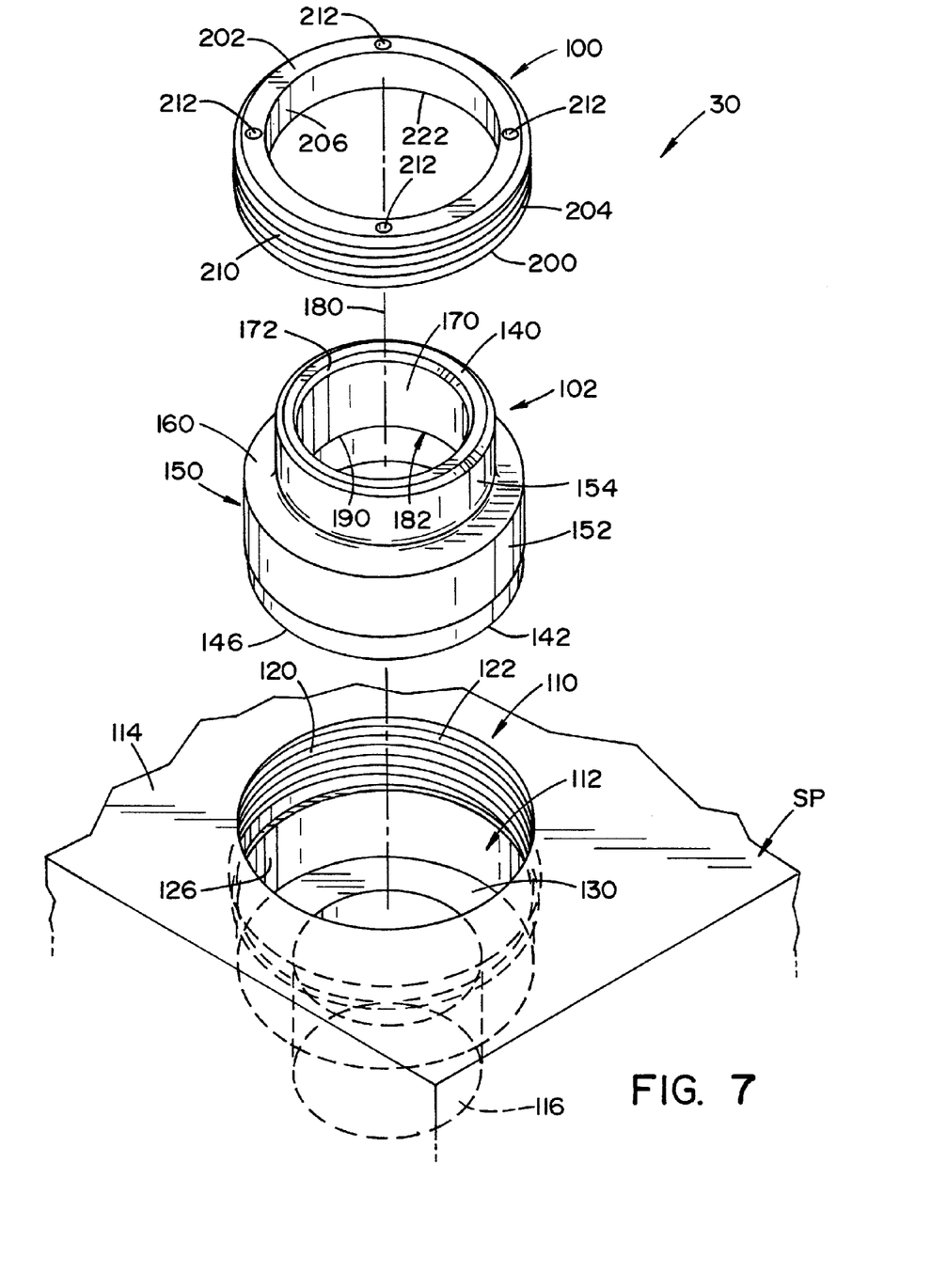
FIG. 7 is an exploded perspective view of the receiver arrangement shown in FIG. 5.

Receiver bushing 102 extends between a top extent 140 and a bottom extent 142, which can define an axial dimension that is less than the thickness of the subplate. In this particular embodiment, the thickness of the subplate is greater than the height of the receiver bushing. Receiver bushing 102 further includes a downwardly facing support edge 146, which can be used to align the bushing axially which will also be discussed in greater detail below. Receiver bushing 102 further includes a radially outwardly facing peripheral surface 150 having a receiver-bearing surface 152 wherein bearing surface 152 can be utilized to laterally align the receiver bushing within the mounting opening, which will be discussed in greater detail below. Further, radially facing surface 150 can further include an upper section 154 that can include top extent 140 and which can extend inwardly of annular gland ring 100. In one embodiment, upper section 154 has a diameter smaller than bearing surface 152 thereby creating a receiver ledge 160, which will be discussed in greater detail below.

Receiver bushing 102 further includes an inner passage 170 shaped to receive a portion of shaft 16 of shank 12. Inner passage 170 can include a top chamfer 172, which can work in combination with shaft chamfer 60 to help align and guide shank 12 into the inner passage. Inner passage 170 extends about a passage axis 180 and includes a mating locking arrangement 182 designed to lockingly engage with the locking arrangement of shank 12. As discussed above, this locking arrangement can be any locking arrangement known in the art without detracting from the invention of this application. In the locking arrangement shown, protuberances 40 and 41 are aligned to engage conical section 190 of passage 170 thereby both securing the shaft in the inner passage and producing a clamping force between subplate and the shank thereby creating a hold-down force between the fixture plate and the subplate.

Figure 5:
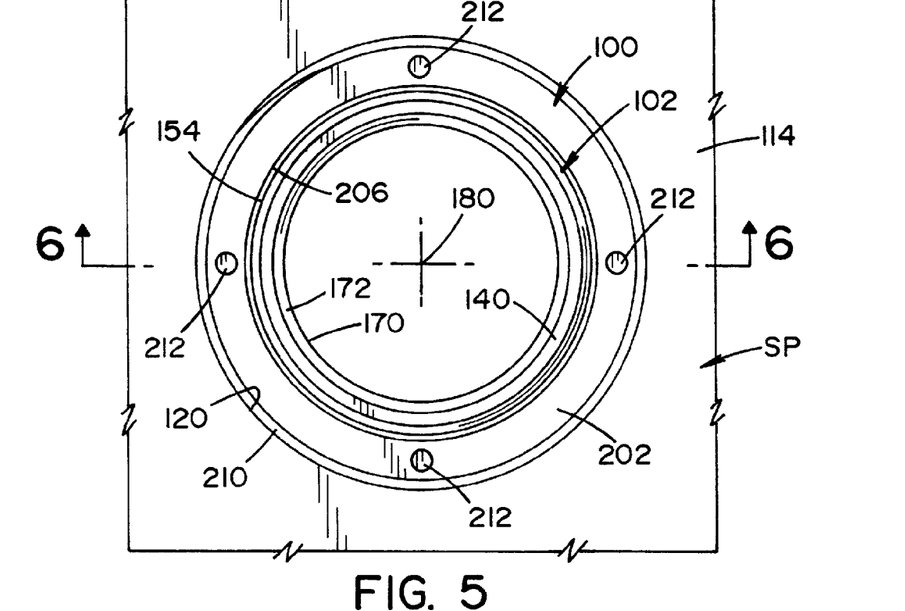
FIG. 5 is a top view of a receiver arrangement according to an embodiment of the present invention.

Annular gland ring 100 is configured to secure the receiver bushing axially relative to passage axis 180. More particularly, gland ring 100 includes a bottom edge 200 and an oppositely facing top edge 202 with a radially outwardly facing side edge 204 and a radially inwardly facing side edge 206. Edge 204 includes a threaded portion 210, which can cover the entire edge 204 or a portion thereof. Gland ring further includes at least one tool receiving arrangement 212, which can include, but is not limited to, a plurality of tool receiving pockets extending about the top edge. In one particular set of embodiments, the tool receiving arrangement includes four evenly spaced pockets about top edge 202. This tool receiving arrangement allows annular gland rings to be fully positionable below upper support plate surface 114 when it is tightened against bushing 102, thereby allowing lower plate surface 74 to directly engage upper subplate surface 114. A spanner wrench (not shown) can be used to engage arrangements 212 to tighten or loosen gland ring 100. As can be appreciated, an as will be discussed more below in relation to other embodiments, other tool arrangements could be used without detracting from the invention of this application.

In operation, receiver bushing 102 is positioned in mounting opening 110 wherein this can be facilitated by a lower receiver chamfer 220. The receiver bushing is urged into mounting opening 110 until support edge 146 engages bottom ledge 130 of the mounting opening. The engagement between the support edge and the ledge can be used to align the receiver bushing within the mounting opening axially. Similarly, bearing surface 126 works in connection with bearing surface 152 to align the receiver bushing laterally within the mounting opening. Once in place, annular gland ring 100 can be positioned in the mounting opening. As with the other components of the invention of this application, annular gland ring can include a chamfer 222 to help guide gland ring 100 relative to the top extent 140 of receiver bushing 102. This can guide the alignment between surfaces 154 and 206 of bushing 102 and ring 100, respectively. Further, when installed, surface 206 can be spaced from surface 154 forming a gap therebetween. Gland ring 100 is then threadingly engaged with threads 122 of opening 110 until a contact edge 230 on bottom 200 engages receiver ledge 160 thereby urging receiver bushing 102 downwardly into the mounting opening thus forcing downwardly facing support edge 146 against bottom ledge 130 of the mounting opening. Thus, annular gland ring 100 maintains the orientation of receiver bushing axially relative to the passage axis. Once the annular gland ring is tightened, the receiver bushing is locked within the mounting opening and the mounting system is in condition for use. While not shown, the receiver bushing and/or the mounting opening and/or the annular gland ring can include an anti-rotation configuration to help prevent the relative rotation of the receiver bushing within the mounting opening. While with the shown locking arrangement, rotation is not a concern, other locking arrangements could necessitate the use of an anti-rotation configuration within the receiver arrangement. This can include, but is not limited to, O-rings producing a resistance fit, locking key slots, knurling and other methods known in the art.

Figure 8:
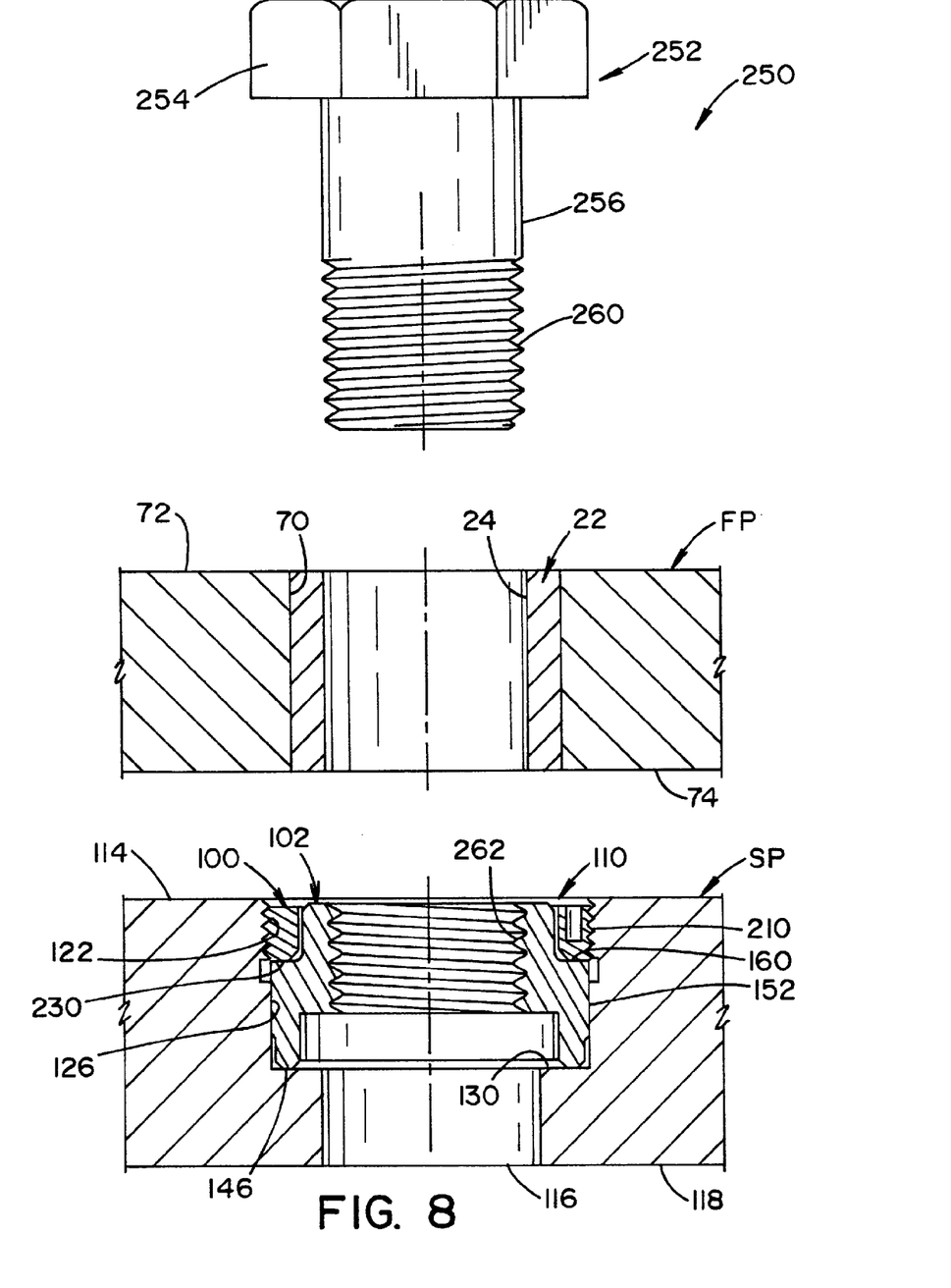
FIG. 8 is an exploded, partially sectioned, view of a mounting system according to other embodiments of the invention of this application.

With reference to FIG. 8, yet another set of embodiments are shown. However, in the interest of brevity, the discussions with reference to FIG. 8 are limited to the differences in the locking arrangement. Further, like components are referenced with the same reference numbers discussed above. More particularly, mounting system 250 includes a shank 252 having a head portion 254 and a shaft portion 256. In this embodiment, shank 252 includes a threaded locking arrangement 260 configured to lockingly engage a threaded mating locking arrangement 262. In order to facilitate the threaded locking between the shank and the receiver bushing, head portion can include any tool-receiving configuration known in the art. In this particular shown embodiment, the head portion includes a hex head configuration allowing a wrench to engage and rotate shank 252.

Figure 9:
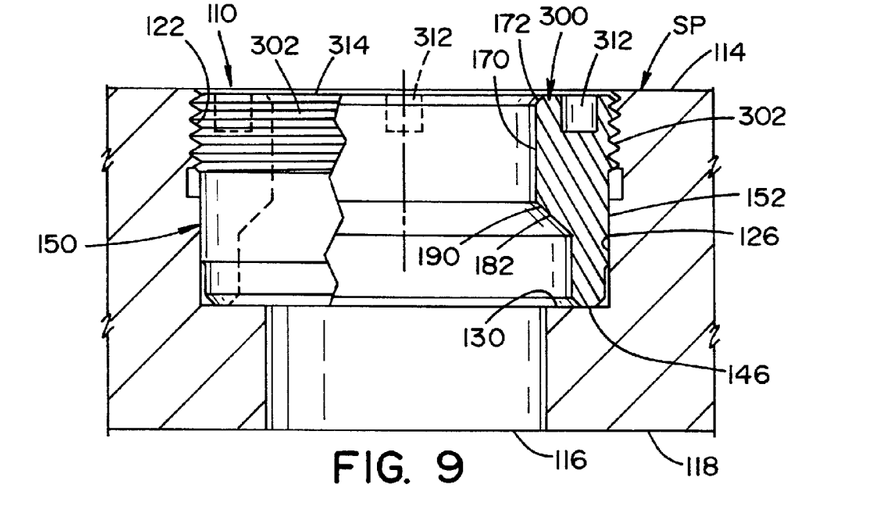
FIG. 9 is a sectional view of yet another embodiment of the invention of this application.

With reference to FIG. 9, shown is yet another set of embodiments of the invention of this application. In this respect shown is receiver bushing 300 which has a unified structure between the receiver bushing and the annular gland ring. More particularly, receiver bushing 300 includes a threaded portion 302 configured to threadingly engage with ID threads 122 of mounting opening 110. As can be appreciated, receiver bushing 300 can include tool receiving arrangement 312 that is larger in that a top surface 314 of bushing 300 is larger than top surface 202 of gland ring 100. While the configuration of bushing 300 is shown to interengage with a mounting opening configured similar to mounting opening 110, this is not required.

Figure 10:
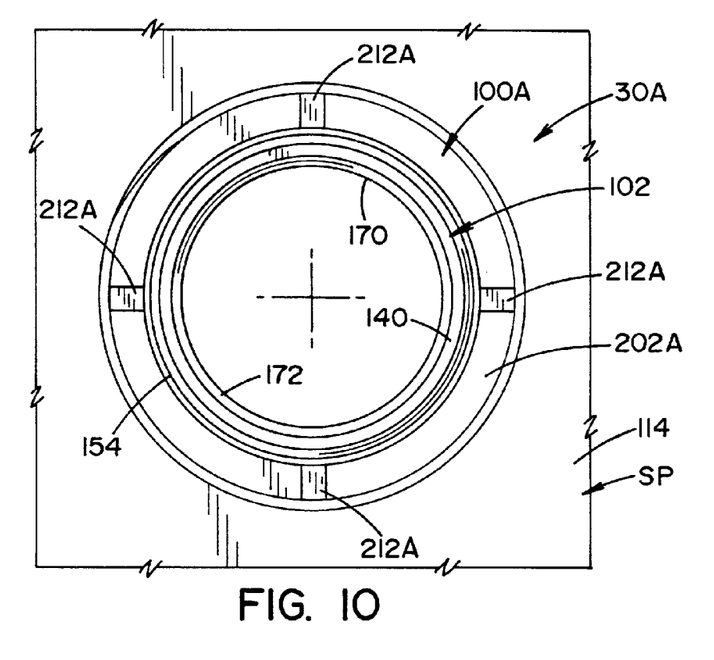
FIG. 10 is a top view of a receiver arrangement according to yet a further embodiment of the present invention.

With reference to FIG. 10, shown is a receiver arrangement 30A according to yet another set of embodiments of the invention of this application which includes a tool receiving arrangement 212A in a gland ring 100A. In this embodiment, arrangement 212A includes slotted pockets positioned about top surface 202A of gland ring 100A. In one particular set of embodiments, the tool receiving arrangement includes four evenly spaced slotted pockets positioned about top edge 202A.

Figure 11:
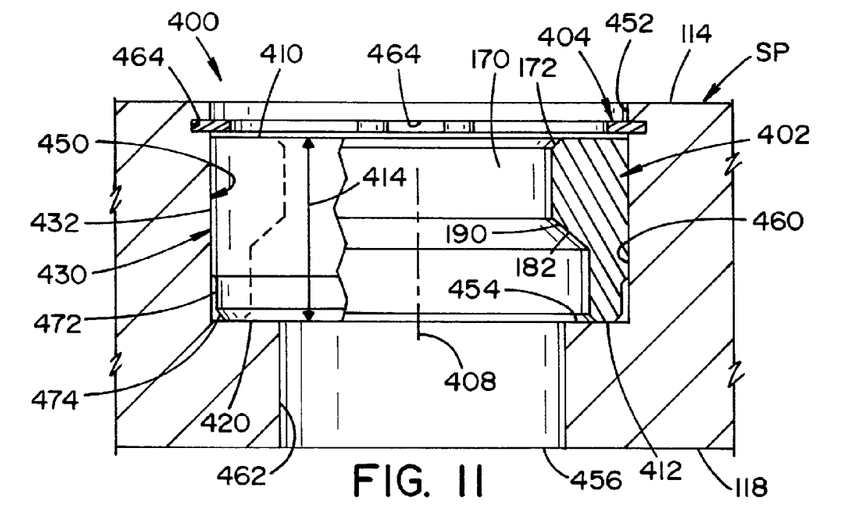
FIG. 11 is a sectional view of even yet another embodiment of the invention of this application.
Figure 12:
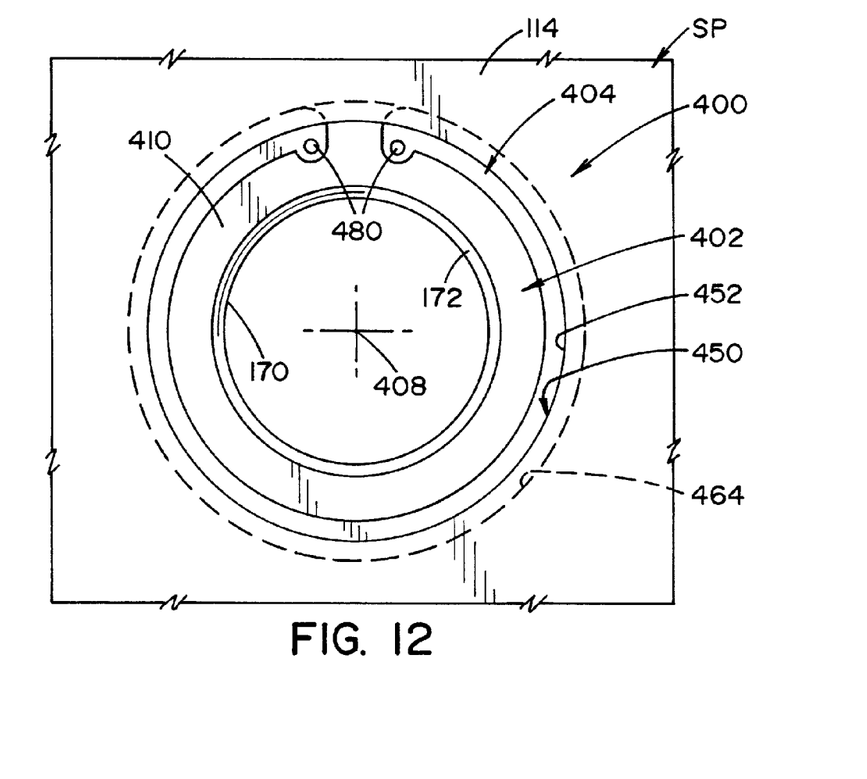
FIG. 12 is a top view of the receiver arrangement shown in FIG. 11.

With reference to FIGS. 11 & 12, shown is yet a further set of embodiments of the invention of this application. Again, in the interest of brevity, common reference numbers are utilized from one or more embodiments above, but this is not to be interpreted as a limitation of this set of embodiments. More particularly, shown is a receiver bushing arrangement 400 having a receiver bushing 402 and an annular gland ring 404.

More particularly, bushing 402 extends along a bushing axis 408 between a top extent 410 and a bottom extent 412 which define an axial height 414 of bushing 402. In the shown embodiment, the thickness of subplate SP is greater than height 414. Receiver bushing 402 further includes a downwardly facing support edge 420 that can be at lower extent 412 which is shown; however, edge 420 could be positioned anywhere along the axis 408 between the top and bottom extents. Support edge 420 can at least in part align bushing 402 axially and/or retain bushing 402 within the mounting opening which will also be discussed in greater detail below. Receiver bushing 402 further includes a radially outwardly facing peripheral surface 430 having a receiver-bearing surface 432 wherein bearing surface 432 can be utilized to laterally align the receiver bushing within the mounting opening, In this respect, shown is a mounting opening 450, which can be a circular opening, having an opening peripheral surface 452 that can extend downwardly from upper subplate surface 114 towards a ledge 454. However, mounting opening 450 could be a through hole or a pocket wherein in the embodiment shown; mounting opening 450 can extend to a bottom extent 456 at lower subplate surface 118. Opening peripheral surface 452 can include multiple sections with or without the same diameter or size. In the embodiment shown, opening peripheral surface 452 includes an opening bearing surface 460, a lower portion 462 and a ring groove 464. In the embodiment shown, bearing surface 460 has a diameter greater than lower portion 462 wherein ledge 454 separates these two sections.

Receiver bushing 402 further includes an inner passage 170 shaped to receive a portion of shaft 16 of shank 12 as described above. However, any inner passage configuration can be used with this embodiment without detracting from the invention of this application.

Receiver bushing 402 includes receiver bearing surface 432 and can include other surfaces such as a lower lead-in portion 472 that can have a lead-in chamfer 474. As can be appreciated, lower portion 472 can help align bushing 402 with opening 450 to aid in the assembly of this component. Once receiver bearing is positioned within opening 450, annular ring 404 can be positioned within groove 464 to generally maintain bushing 402 relative to subplate SP axially relative to axis 408. In this respect, the spacing between ledge 454 and groove 464 can be greater than height 414 such that there is a gap between top extent 410 and ring 404. Thus, when the bearing and ring are installed, there can be some axial play. However, when shank 12 is tightened within opening 170, top extent 410 is urged against ring 404. Therefore, while bearing 402 is generally fixed relative to subplate SP, there can be some relative movement therebetween before the shank is tightened. However, once the shank is tightened within the bearing, the play can be removed and the engagement between the bearing the ring prevents axial movement relative to the subplate. It is preferred that at least some of the receiver bushings have no play to help lock the plate to the subplate.

In yet other embodiments, groove 464 can be a downwardly facing ledge wherein the annular ring is locked between the downwardly facing ledge and the upper extent of the receiver bushing.

Annular ring 404 can be any locking ring known in the art including, but not limited to, a snap ring or a retainer ring made of spring steel that is sized to fit within groove 464 or the ledge. Ring 404 can include openings 480 shaped to receive snap ring pliers that can be used to install and/or remove the snap ring from the subplate. Further, ring 404 can be designed to prevent disassembly of receiver bushing arrangement 400. In yet other embodiments, arrangement 400 can further include a spring washer (not shown) between ledge 454 and support edge 420 to provide an upward support force to maintain receiver bushing 402 in contact with annular ring 404.

Figure 13:
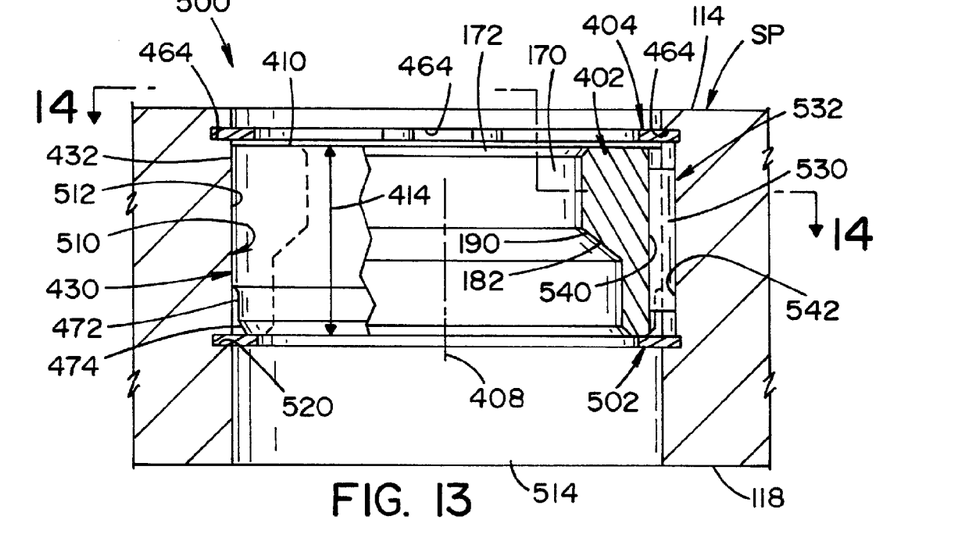
FIG. 13 is a sectional view of a further embodiment of the invention of this application.
Figure 14:
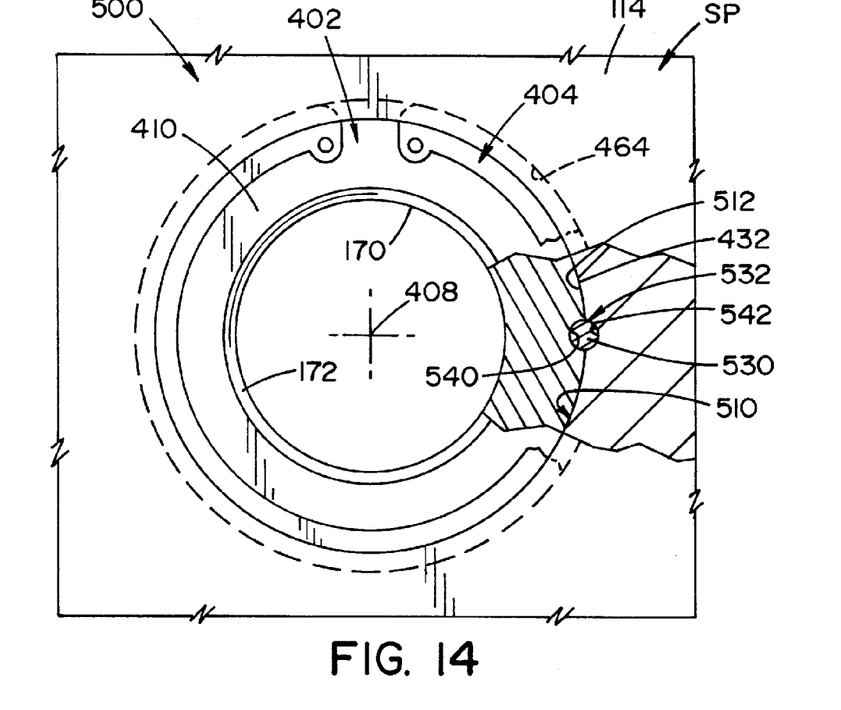
FIG. 14 is a top view of the receiver arrangement shown in FIG. 13.

With reference to FIGS. 13 & 14, yet another set of embodiments is shown. As an initial note, while this embodiment is being shown in a similar arrangement as arrangement 400, this embodiment can be utilized with any of the embodiments in this application. In greater detail, shown is a receiver bushing arrangement 500 having a receiver bushing 402, an annular gland ring 404 and a second annular gland ring 502.

More particularly shown is a mounting opening 510 that has an opening peripheral surface 512 that can extend downwardly from upper subplate surface 114 towards bottom subplate surface 118. Again, mounting opening 510 could be a through hole or a pocket wherein in the embodiment shown; mounting opening 510 can extend to a bottom extent 514 at lower subplate surface 118. Mounting opening 510 includes ring groove 464 and a ring groove 520 wherein annular gland ring 502 can be configured to be received in groove 520. Thus, rings 404 and 502 can generally maintain receiver bushing 402 axially within the mounting opening. As with receiver bushing arrangement 400, this embodiment can have some play between rings 404, 502 and bushing 402 such that tightening shank 12 will urge bushing 402 into engagement with ring 404. However, rings 404 and 502 maintain bushing 402 within the mounting opening.

As with the embodiments described above, groove 464 can be a downwardly facing ledge and groove 520 could be an upwardly facing ledge wherein rings 404 and 502 can hold the receiver bushing between these opposing ledges.

In yet other embodiments, the receiver bushing can be allowed to mover laterally within the opening when the particular bushing and shank arrangement is not an alignment opening. Thus bearing surface should not be limited to only those involved in close tolerance fits between adjacent components.

As with other embodiments of this application, an anti rotation pin 530 can be utilized in a pin pocket 532 to prevent rotation of receiver bushing 402 relative to subplate SP. Pin pocket 532 can be formed by arcuate notch 540 in bushing 402 and arcuate notch 542 in subplate SP. While the pin can be dimensioned to have a resistance fit in pin pocket 532, it can also be configured to be trapped between rings 404 and 502. Further, the anti rotation device can be formed by other devices known in the art including, but not limited to, O-rings producing a resistance fit, other types of locking key slots, knurling and other methods known in the art.

In even yet further embodiments of this application, the receiver bushing can include an inner passage that includes oppositely facing locking arrangements designed to lockingly engage with the locking arrangement of a shank extending into the bushing from either side. Thus, the bushing can be a double sided bushing wherein locking interengagement is possible from both sides of the subplate.

Figure 15:
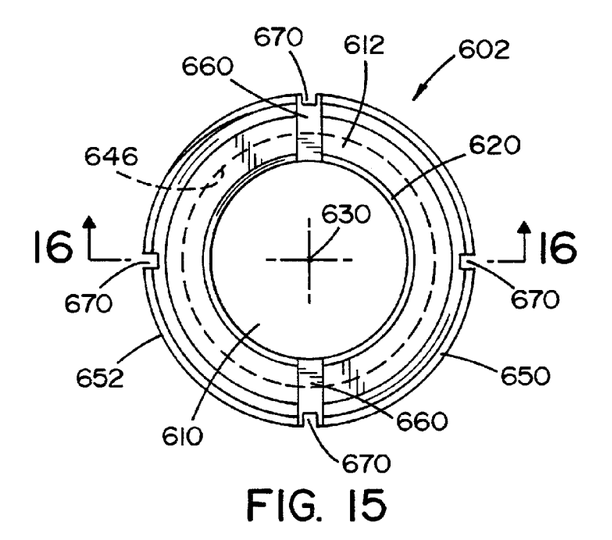
FIG. 15 is a top view of yet another embodiment of the invention of this application; and, FIG. 16 is a sectional view taken along lines 16-16 in FIG. 15.
Figure 16:
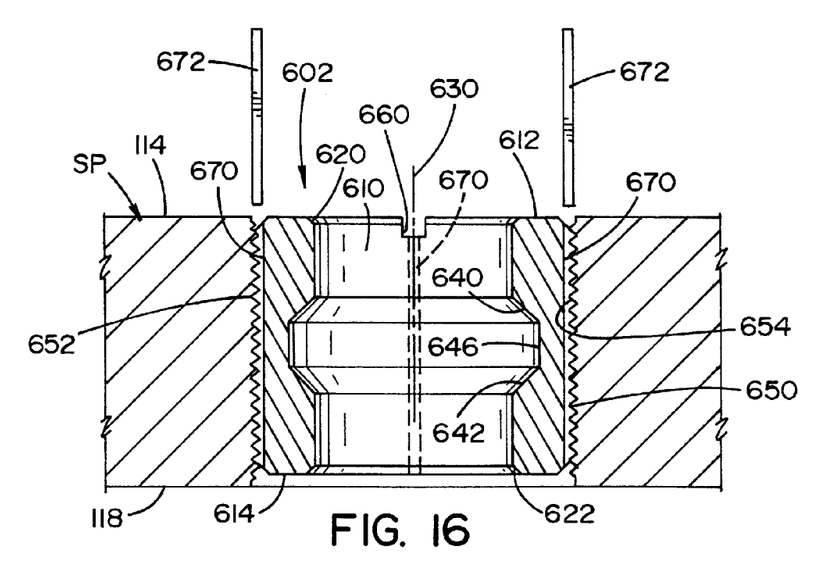

More particularly, and with special reference to FIGS. 15 & 16, a receiver bushing 602 is shown which can have any of the features describe above. Busing 602 includes an inner passage 610 shaped to receive a portion of shaft 16 of shank 12 from either a top side 612 or a bottom side 614 of the bushing. As with the other embodiments, passage 610 can include a chamfer, but in this set of embodiments, bushing 602 can include a top chamfer 620 and a bottom chamfer 622 in that this bushing is a double sided bushing. Inner passage 610 extends about a passage axis 630 and includes two mating locking arrangements 640 and 642. As with the other embodiments, these locking arrangements are designed to lockingly engage with the locking arrangement of shank 12 and can be any locking arrangement of this application. Further, passage 610 can include a spacing 646 between locking arrangements 640 and 642 to allow for the function of the locking arrangements. Further, this spacing can allow for different thickness of subplate SP such that a standard shaft can be used regardless of the material thickness of the subplate. Further discussion of the locking arrangement will not be discussed in this section in the interest of brevity in that it is discussed above.

The bushing of these embodiments can include any configuration to secure the bushing to subplate SP including those discussed above. Further, as with all embodiments of this application, the bushing can include an outer threaded portion 650. In the embodiment shown, outer thread 650 can extend along a substantial portion of a bushing outer surface 652 and be configured to threadingly engage with a threaded bore 654 in subplate SP. Further, bushing 602, in the threaded embodiment shown, can include one or more tool notches 660 to allow the threaded bushing to be threaded into the subplate from either upper subplate surface 114 or from lower subplate surface 118. While tool notches 660 are only shown on side 612, these could be on side 614 or on both sides of the bushing without detracting from the invention and the description and figures of this application are not intended to limit the invention.

Bushing 602 can further include a locking arrangement to lock the bushing within the subplate at a desired position therein and prevent unwanted movement or rotation of the bushing relative to the subplate. This can include any locking arrangement of this application and can include, but is not limited to, one or two jam nuts (not shown), an anti rotation pin as described above, thread locking technology known in the art, and/or a key locking systems such as the ACME key locking system. In the embodiment shown, bushing 602 can include one or more locking keyways or grooves 670 circumferentially spaced about axis 630. With these grooves, one or more keys 672 can be forced into these grooves once the bushing is in the desired position within the subplate. These keys damage the threads and prevent unwanted unthreading of the bushing relative to the opening.

As can be appreciated, the double sided bushing of these embodiments can increase flexibility in the tooling system. This can include the subplate having the ability to have components mounted to either side without the need for separate mounting openings. Further, even in situations wherein the subplate is mountable directly to a machining table or one surface is fully cover when in place, each side of the subplate could be configured for a different set up wherein one subplate could be used for multiple set ups or operations. As can be appreciated, this can double the versatility of the subplate. Yet even further, the bushing can then have one locking arrangement or embodiment extending from one side and a different locking arrangement or embodiment extending from the other side wherein a single bushing could work with multiple locking arrangements wherein the end use can choose which arrangement is on the working side of the system such that the arrangement that is on the non-working side would be dormant.

The receiver bushings of this application can be made from any material known in the art, which includes carbon steel. Further, the receiver bushing can have any treatment known in the art including a black oxide coating and a hardness on the Rockwell-C scale of between 45 and 60 Rc.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted nearly as illustrative of the invention and not as a limitation.

Having thus described the invention, it is so claimed:

1. A mounting and alignment system for selectively securing and accurately aligning a first plate relative to a second plate, the first plate having a first plate through hole extending from a first plate outer surface to a first plate inner surface, the second plate having a second plate outer surface and a second plate inner surface, the first plate inner surface engaging the second plate inner surface when in a secured and aligned condition, the second plate further including a mounting opening extending into the second plate inner surface toward the second plate outer surface, the mounting opening having an opening peripheral surface and an opening bearing surface, said system being configured to align the mounting opening relative to the through hole thereby aligning the first plate relative to the second plate in a desired alignment, the system comprising a shank having a shaft portion extending from a head portion to a distal end spaced from the head portion, the shaft portion extending along a shaft axis between the head portion and the distal end and having a radial shaft surface coaxial with the shaft axis, the shaft surface being sized to pass through an associated first plate through hole and to laterally align the associated through hole relative to the shaft axis, the shank further including a locking arrangement selectively positionable between a locked condition and an unlocked condition; the system further comprising an annular receiver bushing including an inner passage extending about a passage axis and a radially outwardly facing peripheral bushing surface, the inner passage being shaped to receive the shaft portion such that the shaft axis is axially aligned with the passage axis of the annular receiver bushing and the passage having a mating locking arrangement allowing the locking arrangement of the shank to selectively interengage with the receiver bushing and secure the shank relative to the receiver bushing in an axial alignment, the outwardly facing bushing surface including a receiver bearing surface sized to fittingly engage an opening bearing surface in an associated second plate thereby creating a close tolerance fit and maintaining a lateral alignment between the receiver bushing and the associated second plate opening and fixing the receiver bushing relative to the associated second plate laterally, the receiver bushing further including an upwardly facing annular support surface and a downwardly facing annular support surface; the system further comprising a locking ring having an outer peripheral edge configured to selectively engage a locking feature of the associated mounting opening in a locked position and having a downwardly facing annular surface portion, the downwardly facing annular surface portion of the locking ring facing the upward facing annular support surface of the annular receiver bushing and restricting axial movement of the receiver bushing and maintaining the receiver bushing between the locking ring and a bottom surface formed relative to the associated mounting opening and the system securing and aligning the associated first plate relative to the associated second plate based on the axial alignment.

2. The mounting system of claim 1, wherein the locking ring is a retainer ring and the locking feature includes a locking groove extending about the associated mounting opening.

3. The mounting system of claim 1, wherein the locking ring is a retainer ring and the locking feature includes a downwardly facing locking ledge extending about the associated mounting opening.

4. The mounting system of claim 1, wherein the bottom surface is formed in the associated mounting opening as an upwardly facing locking ledge extending about the associated mounting opening and the locking ring is a retainer ring.

5. The mounting system of claim 1, wherein the locking ring is a first locking ring and the system further including a second locking ring, the locking feature is a first locking feature and the system further includes a second locking feature, the second locking ring configured to engage the second locking feature and the second ring forming the bottom surface.

6. The mounting system of claim 5, wherein the first and second locking ring are first and second retainer rings and the first and second locking features includes separate and spaced locking grooves extending about the associated mounting opening.

7. The mounting system of claim 6, wherein the first and second locking rings are the same retainer rings.

8. The mounting system of claim 5, wherein the annular receiver bushing has an axial bushing thickness and the spacing between the first and second locking rings is greater than the bushing thickness.

9. The mounting system of claim 1, wherein the surface is a bottom ledge machined into the associated mounting opening.

10. The mounting system of claim 1, further including an anti rotation pin configured to engage pin pockets in the outwardly facing bushing surface and the associated mounting opening to prevent rotation of the annular receiver bushing relative to the associated mounting opening.

11. The mounting system of claim 1, wherein the associated opening peripheral surface and the opening bearing surface are the same surface.

12. The mounting system of claim 1, wherein the outwardly facing bushing surface and the receiver bearing surface are the same surface.

13. The mounting system of claim 1, wherein the annular receiver bushing has an axial bushing thickness and the spacing between the bottom surface and the locking ring is greater than the bushing thickness.

14. The mounting system of claim 1, wherein the peripheral bushing surface includes a first peripheral bushing surface and a second peripheral bushing surface, the first peripheral bushing surface having a first diameter and the second peripheral bushing surface having a second diameter, the first diameter being greater than the second diameter forming a receiver ledge between the first and second peripheral surfaces, the locking ring being engageable against the receiver ledge and preventing outward movement of the receiver bushing from the associated mounting opening.

15. The mounting system of claim 1, wherein the locking arrangement includes at least one ball that can be forced radially outwardly to engage the mating locking arrangement in the inner passage.

16. The mounting system of claim 15, wherein the at least one ball includes a pair of opposing balls that can be forced radially outwardly in opposite directions to engage the mating locking arrangement.

* * * * *